(12) United States Patent
Koc et al.

(10) Patent No.: US 9,210,550 B2
(45) Date of Patent: Dec. 8, 2015

(54) NETWORK VETTING OF WIRELESS MOBILE DEVICE INITIATED DISCONNECT

(75) Inventors: Ali Koc, Hillsboro, OR (US); Maruti Gupta, Portland, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/592,621

(22) Filed: Aug. 23, 2012

(65) Prior Publication Data

US 2013/0231120 A1 Sep. 5, 2013

Related U.S. Application Data

(60) Provisional application No. 61/542,086, filed on Sep. 30, 2011.

(51) Int. Cl.
*H04W 52/02* (2009.01)
*H04W 4/06* (2009.01)
(Continued)

(52) U.S. Cl.
CPC .............. *H04W 4/06* (2013.01); *H04B 7/0456* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/08* (2013.01); *H04W 28/042* (2013.01); *H04W 36/0005* (2013.01); *H04W 48/18* (2013.01); *H04W 52/0235* (2013.01); *H04W 52/04* (2013.01); *H04W 72/005* (2013.01); *H04W 72/042* (2013.01); *H04W 72/1215* (2013.01); *H04W 76/048* (2013.01);

(Continued)

(58) Field of Classification Search
CPC . H04W 72/02; H04W 72/04; H04W 72/0406; H04W 52/02
USPC ............ 370/329; 455/450, 466, 70, 574, 572, 455/452.1, 452.2
See application file for complete search history.

(56) References Cited

U.S. PATENT DOCUMENTS

| 7,969,924 B2* | 6/2011 | Young et al. ................... 370/311 |
| 2012/0122461 A1* | 5/2012 | Hossain et al. ............... 455/450 |

OTHER PUBLICATIONS

3GPP TS 25.331, "Technical Specification Group Radio Access Network; Radio Resource Control (RRC); Protocol Specification", Apr. 2011, pp. 1863, vol. 10.3.1, Release 10, Organizational Partners, France.

(Continued)

*Primary Examiner* — Sharad Rampuria
*Assistant Examiner* — Farideh Madani
(74) *Attorney, Agent, or Firm* — Thorpe North & Western LLP

(57) ABSTRACT

Technology is discussed for allowing a wireless mobile device, such as a User Equipment (UE), to coordinate with a Radio Access Network, such as an Evolved-Universal Terrestrial Radio Access Network (E-UTRAN), to tear down a power intensive messaging connection, such as a Radio Resource Control (RRC) connection, to met needs of both the UE and the E-UTRAN. The UE can initiate the tear down process based on information at the UE about the potential need of the UE for the RRC connection and/or the state of the UE's battery charge. The E-UTRAN can then determine whether to grant the request based on the potential overhead involved. The determination can be important to the E-UTRAN because of the large overhead associated with frequent disconnection and re-establishment of the RRC connection. Upon receipt of an affirmative response, the UE can tear down the RRC connection to save battery power.

20 Claims, 10 Drawing Sheets

(51) Int. Cl.
| | |
|---|---|
| *H04B 7/04* | (2006.01) |
| *H04L 12/891* | (2013.01) |
| *H04W 52/04* | (2009.01) |
| *H04B 7/06* | (2006.01) |
| *H04L 5/00* | (2006.01) |
| *H04W 72/04* | (2009.01) |
| *H04W 4/08* | (2009.01) |
| *H04W 36/00* | (2009.01) |
| *H04W 28/04* | (2009.01) |
| *H04W 72/00* | (2009.01) |
| *H04W 72/12* | (2009.01) |
| *H04W 76/04* | (2009.01) |
| *H04L 12/709* | (2013.01) |
| *H04W 48/18* | (2009.01) |
| *H04L 12/18* | (2006.01) |
| *H04L 25/02* | (2006.01) |
| *H04W 28/10* | (2009.01) |

(52) U.S. Cl.
CPC ............ *H04B 7/0613* (2013.01); *H04L 12/189* (2013.01); *H04L 25/0204* (2013.01); *H04W 28/10* (2013.01); *Y02B 60/50* (2013.01)

(56) References Cited

OTHER PUBLICATIONS

3GPP TS 36.306, "Technical Specification Group Radio Access Network; Evolved Universal Terrestrial Radio Access (E-UTRA); User Equipment (UE) radio access capabilities", Dec. 2010, pp. 17, vol. 10.0.0, Release 10, Organizational Partners, France.

3GPP TS 36.331, "Technical Specification Group Radio Access Network; Evolved Universal Terrestrial Radio Access (E-UTRA); Radio Resource Control (RRC); Protocol Specification", Dec. 2010, pp. 276, vol. 10.0.0, Release 10, Organizational Partners, France.

* cited by examiner

NETWORK VETTING OF WIRELESS MOBILE DEVICE INITIATED DISCONNECT

RELATED APPLICATIONS

This application claims the benefit of and hereby incorporates by reference U.S. Provisional Patent Application Ser. No. 61/542,086, filed Sep. 30, 2011.

BACKGROUND

Improvements in wireless networks often also create increasing demands on battery power. The desirability of increasing the duration of a battery charge while meeting these new demands, places a premium on power savings. Power can be used to maintain many different resources that allow a wireless mobile device to function in a Wireless Wide Area Network (WWAN).

However, the ways in which power is used to allow a wireless mobile device to function in a WWAN involve inefficiencies. These inefficiencies unnecessarily drain power. By determining what these inefficiencies are and removing them, additional power savings can be achieved.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
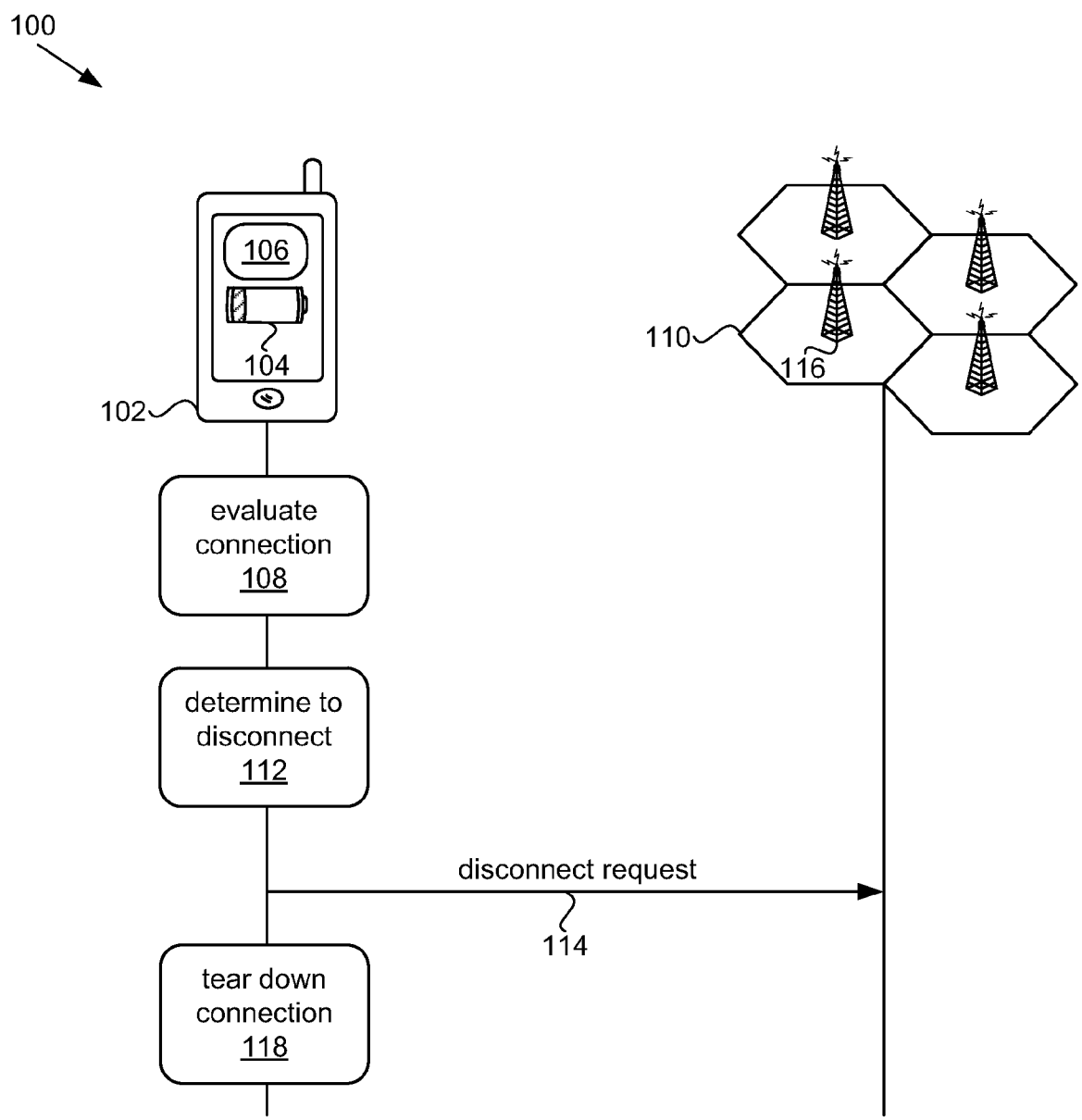
FIG. 1 is a block diagram illustrating a process to disconnect a Radio Resource Control (RRC) connection that is controlled by a User Equipment (UE)

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

Different terminology for wireless mobile devices is used in different wireless specifications. As used herein, a wireless mobile device can be a User Equipment (UE) or a Mobile Station (MS), among other possibilities. Throughout this application, the terms wireless mobile device, UE, and MS can be used interchangeably.

As used herein the term "Radio Access Network" (RAN) refers to a technology that implements an air interface within a Wireless Wide Area Network (WWAN). Different terminologies for RANs are used in different wireless standards. Terminology used for different variations of a RAN can include, but is not limited to: an Evolved-Universal Terrestrial Radio Access Network (E-UTRAN), as defined in specifications for Third Generation Partnership Project (3GPP) Long Term Evolution (LTE); an Access Service Network (ASN), as defined in specifications for the Institute of Electronics and Electrical Engineers (IEEE) 802.16, commonly referred to as WiMax; a Global System for Mobile Communications (GSM) Radio Access Network (GRAN), as defined is corresponding specifications; a GSM Edge Radio Access Network (GERAN), as defined is corresponding specifications; a Universal Terrestrial Radio Access Network (UTRAN), as defined is corresponding specifications; and, a Universal Mobile Telecommunications System (UMTS), as defined in corresponding specifications. Throughout this application, the terms RAN, E-UTRAN, ASN, and terms for other types of RANs used in WWANs can be used interchangeably.

As used herein the term "cellular radio tower" is defined as a wireless communication device in a WWAN configured to communicate with a plurality of wireless mobile devices located within a geographic region referred to as a cell. Different terminologies for cellular radio towers are used in different specifications. Terminology used for different variations of a cellular radio tower can include, but is not limited to, a Base Station (BS), an enhanced/evolved Node B (eNodeB), a WWAN transmission point, and a WWAN node. The terms are used interchangeably, unless otherwise noted. The actual definition of a BS or eNodeB is provided in their IEEE 802.16 and 3GPP LTE specifications, respectively.

As used herein, the term "messaging connection," refers to a communication link that handles control plane signaling in a WWAN. One non-limiting example for purposes of illustration, in the context of 3GPP LTE, is a Radio Resource Control (RRC) connection. Throughout this application, the terms messaging connection and RRC connection can be used interchangeably.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms can be defined elsewhere in the body of this specification.

Example Embodiments

An initial overview of technology embodiments is provided below and then specific technology embodiments are described in further detail later. This initial summary is intended to aid readers in understanding the technology more quickly, but is not intended to identify key features or essential features of the technology, nor is it intended to limit the scope of the claimed subject matter.

With the power demands placed on wireless mobile devices in a contemporary Wireless Wide Area Network (WWAN) and the desirability of extending the life of a battery charge on a wireless mobile device, a need exists to extend power saving capabilities. In Wireless Wide Area Networks (WWAN), a communication link, or messaging connection, can be used to provide a wireless mobile device, such as a User Equipment (UE), with control information used to transmit and receive communications within the Radio Access Network (RAN) of the WWAN. However, in wireless communication systems, large power budgets are required to maintain connections to the Radio Access Network (RAN) of the WWAN.

Resources such as a transceiver and processor in the UE can be used substantially continuously while the messaging connection is established. The use of these resources can consume large amounts of power to maintain the messaging connection, such as a Radio Resource Control (RRC) connection in the context of Third Generation Partnership Project (3GPP) Long Term Evolution (LTE). When a UE will not be transmitting and/or receiving data, however, it can tear down the RRC connection and only listen for and process data relatively infrequently on a paging channel.

The paging channel can be used to indicate to the UE when it actually needs an RRC connection to transmit and receive data on the uplink and downlink control channels, shared data channels, and other types of transmission and broadcast channels. With respect to 3GPP LTE, for example, a UE can expend 500 to 1500 milliwatts to maintain an RRC connection. Conversely, the same UE only needs to expend 5 to ten milliwatts in idle mode to listen for paging messages, potentially one-hundredth (two orders of magnitude), or less, of the power used to maintain the messaging connection used to transmit and receive data.

One way to save battery power at a UE is to tear down the RRC connection when data is not received. By tearing down a connection, a wireless mobile device can save the power associated with maintaining that connection. Furthermore, a wireless mobile device can evaluate its traffic needs and the needs of any applications running on the wireless mobile device. A wireless mobile device can use the results of such evaluations to determine whether a connection needs to be maintained.

When analyzed on a sub-frame level (at each millisecond), data may not be received relatively frequently. Unfortunately, tearing down a network connection adds additional overhead that can place strains on the network. A lot of air time and radio resources are consumed by the overhead involved in tearing down and RRC connections. These strains can be especially problematic where the network has to re-established the connection later, multiple wireless mobile devices are involved, and/or connections are torn down and re-established very frequently. At times, such strains have been known to unduly strain WWANs.

Approaches to processes for tearing down messaging connections have allowed wireless mobile devices to unduly strain WWANs with overhead involved tearing down and re-establishing messaging connections for over-eager wireless mobile devices looking to save power. On the other side, alternative approaches have given relatively infrequent opportunities for wireless mobile devices to tear down messaging connections, leading to large inefficiencies with respect to power savings. These inefficiencies are in part because a RAN is not directly privy to information about a given wireless mobile device's needs for a messaging connection.

Both types of approaches leave out the needs of and/or information available at either the wireless mobile device or the RAN. In accordance with one embodiment, an approach for avoiding problems of using too much overhead at the RAN, while optimizing power savings at a wireless mobile device, can capitalize on information monitored at both of these entities. A negotiation process can take place between a given wireless mobile device and an RAN to allow a UE to tear down a messaging connection as often as a RAN can allow, without using undesirable amounts of overhead at the RAN.

The process can be initiated by the wireless mobile device based on information residing at the wireless mobile device about its potential need for a messaging connection and/or its battery power. A legacy carrier message between the wireless mobile device and the RAN can be configured to provide a disconnect request to avoid additional infrastructure. The request can then be vetted by the RAN.

Based on information available to the Evolved Packet Core (EPC) in communication with the RAN, and/or a cellular radio tower therein, a determination can be made on whether to grant the request from the UE to tear down the messaging connection and cease substantially all uplink and downlink activities relative to the UE, aside from paging messages. The available information can include information about, among other types of information discussed below and apparent to prevent undue overhead, a number of wireless mobile devices that could make similar demands of the RAN and the connection history of the given wireless mobile device making the demand to the RAN. The wireless mobile device can then wait until it receives an affirmative response to its request. Upon receiving the affirmative response, the UE can tear down the messaging connection, thereby ceasing most uplink and downlink transmissions and saving power without unduly straining the RAN. Additional details are discussed below.

FIG. 1 depicts a process 100 to disconnect an RRC connection. The process depicted in FIG. 1 is controlled by a wireless mobile device 102, Mobile Station (MS), and/or a User Equipment (UE), all of which can be referred to as a UE throughout the figures. As an important statement of the generality of embodiments discussed in this disclosure, while the terminology of the 3GPP LTE standards are often used throughout this specification, it is not intended to be limiting, and there are exceptions in the use of more general terminology in portions of this specification to further communicate this point.

In the process illustrated in FIG. 1, a UE 102 can be in a position to determine its potential need for an RRC connection and to balance that potential need against the ability to conserve power by severing the RRC connection. When the UE is allowed to control the process for disconnecting an RRC connection, the UE can take advantage of the information it possess. Such information includes information about the UE's potential need for the RRC connection and its power constraints to determine when the benefits of saving power outweigh the benefits of maintaining an RRC connection from the perspective of the UE.

A wireless mobile device 102 is depicted in FIG. 1 with an icon indicative of remaining power 104 within the UEs battery charge. Additionally, a set of applications 106 is depicted with the UE. The process 100 begins with the UE evaluating 108 its need for an RRC connection with a RAN 110, which in some, but not all, embodiments can be an Evolved-Universal Terrestrial Radio Access Network (E-UTRAN).

The UE 102 can make this evaluation 108 on the basis of a potential need for communication with applications within the set of applications 106 for the RRC connection. In certain embodiments, the evaluation can also be balanced against the remaining power 104 of the UE. Where the potential need for the RRC connection and/or the remaining power indicate that the power cost of maintaining the RRC connection is no longer warranted, the UE can determine 112 to disconnect, or tear down, the RRC connection.

After the determination 112 to disconnect the RRC connection, the UE 102 can inform an evolved Node B (eNodeB) 116 within the E-UTRAN 110 of its intention to tear down the RRC connection with a disconnect request 114. The process 100 concludes with the UE tearing down 118 the RRC connection.

As can be appreciated, the disconnect process 100 depicted in FIG. 1 can be one-sided. The UE 102 can make a determination 112 based on an evaluation 108 of its potential needs and concerns, send a message 114 to inform the E-UTRAN 110 of its intention, and then tear down 118 the RRC connection, without waiting for any input from the E-UTRAN. In other words, the implications for the E-UTRAN of tearing down the RRC connection are not considered. Although the process 100 depicted in FIG. 1 is beneficial to the UE, it can have unintended consequences for the E-UTRAN, some of which can be illustrated with the help of FIG. 2.

Figure 2:
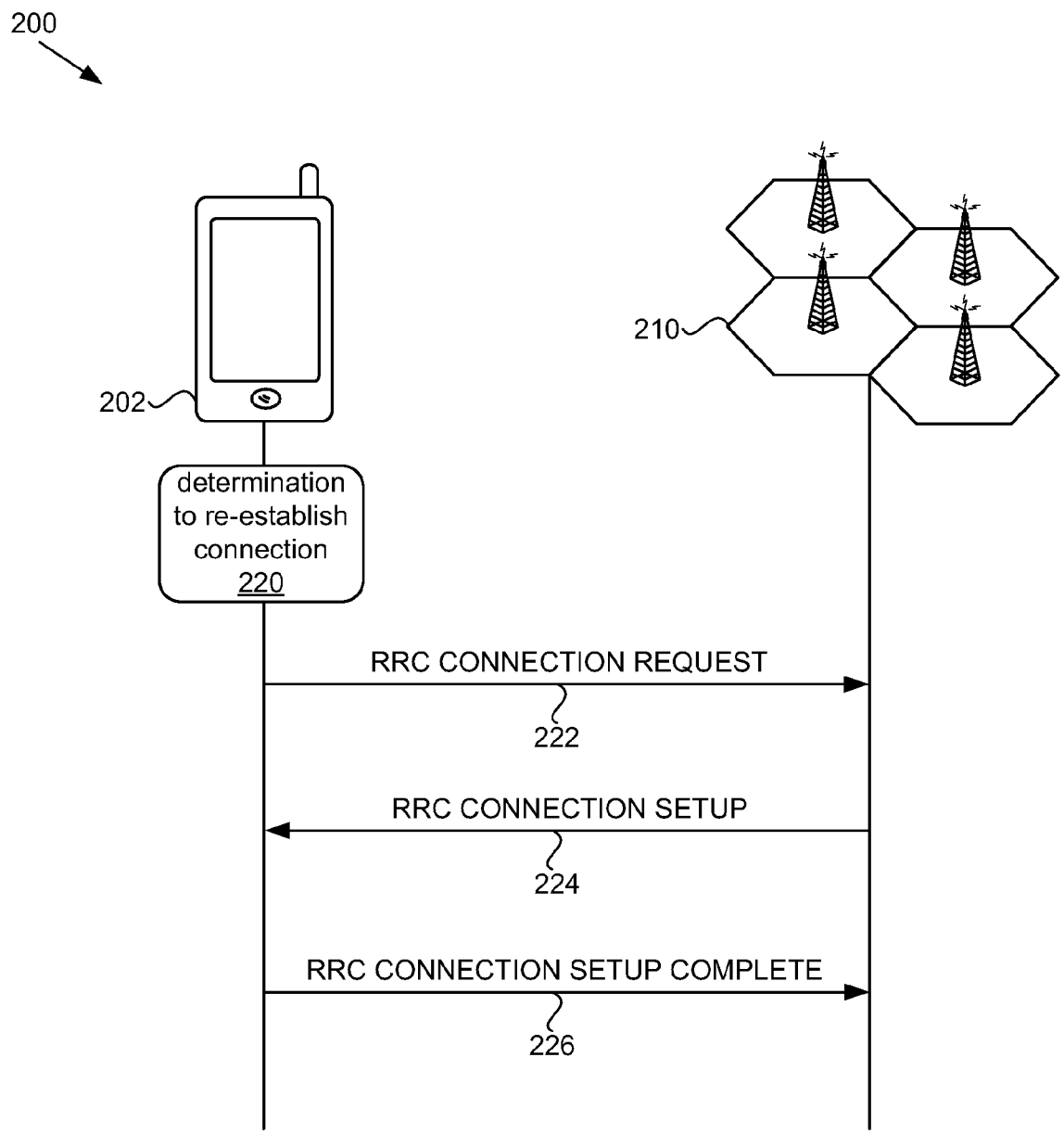
FIG. 2 is a block diagram illustrating a process for RRC connection establishment/re-establishment.

FIG. 2 depicts a process 200 for establishment of a messaging connection that can also apply to the re-establishment of such a connection. As can be appreciated, the process of establishing an RRC connection can generate a considerable amount of overhead for the RAN 210. The process begins with a wireless mobile device 202 making a determination 220 that a messaging connection needs to be established/re-established.

After the determination 220 has been made, in embodiments that implement 3GPP LTE standards, an RRC CONNECTION REQUEST message 222 is sent from the UE 202 to the E-UTRAN 210. The E-UTRAN responds with an RRC CONNECTION SETUP message 224. In turn, the UE replies with an RRC CONNECTION SETUP COMPLETE message 226. The details for the RRC CONNECTION REQUEST message, the RRC CONNECTION SETUP message, and the RRC CONNECTION SETUP COMPLETE message can be found in specifications for 3GPP LTE, particularly Technical Specification (TS) 25.331. Although the embodiment depicted in FIG. 2 is described with messages specifically defined for 3GPP LTE, this description is made for purposes of illustration, not limitation. Those of ordinary skill in the art will recognize analogous messages for WiMAX and/or other WWAN standards.

The three-way handshaking involved in FIG. 2 can serve to illustrate the amount of overhead involved every time that a UE needs to re-establish an RRC connection after that connection has been disconnected. In addition to this overhead, to a lesser extent, overhead involved in the disconnection process also needs to be considered. Where control over the disconnection process resides with a wireless mobile device 202, the impact of this overhead cannot be overlooked.

In the past, RANs have experienced strain and even overload due to the overhead involved in tearing down and re-establishing messaging connections, as exemplified in part by FIG. 2. Wireless mobile devices have repeatedly used disconnection processes on a frequent basis to save battery power. Such wireless mobile devices have been known to cycle through the process of disconnecting and re-establishing a connection with frequencies defined in milliseconds. For these reasons, a UE controlled process for disconnecting RRC connections defined in Release 8 and Release 9 of the specifications for 3GPP LTE was removed for Release 10 and Release 11. Throughout this application, Release 11 can refer to the prerelease (i.e. State 2 freeze) issued by 3GPP LTE in March of 2012. The strains experienced by RANs have also proved to be problems for non-3GPP LTE WWANs. The problems caused by Apple's iPhone, which previously severed and reestablished connections with RANs with a high frequency to save battery power, on non-3GPP LTE WWANs provide one example.

Figure 3:
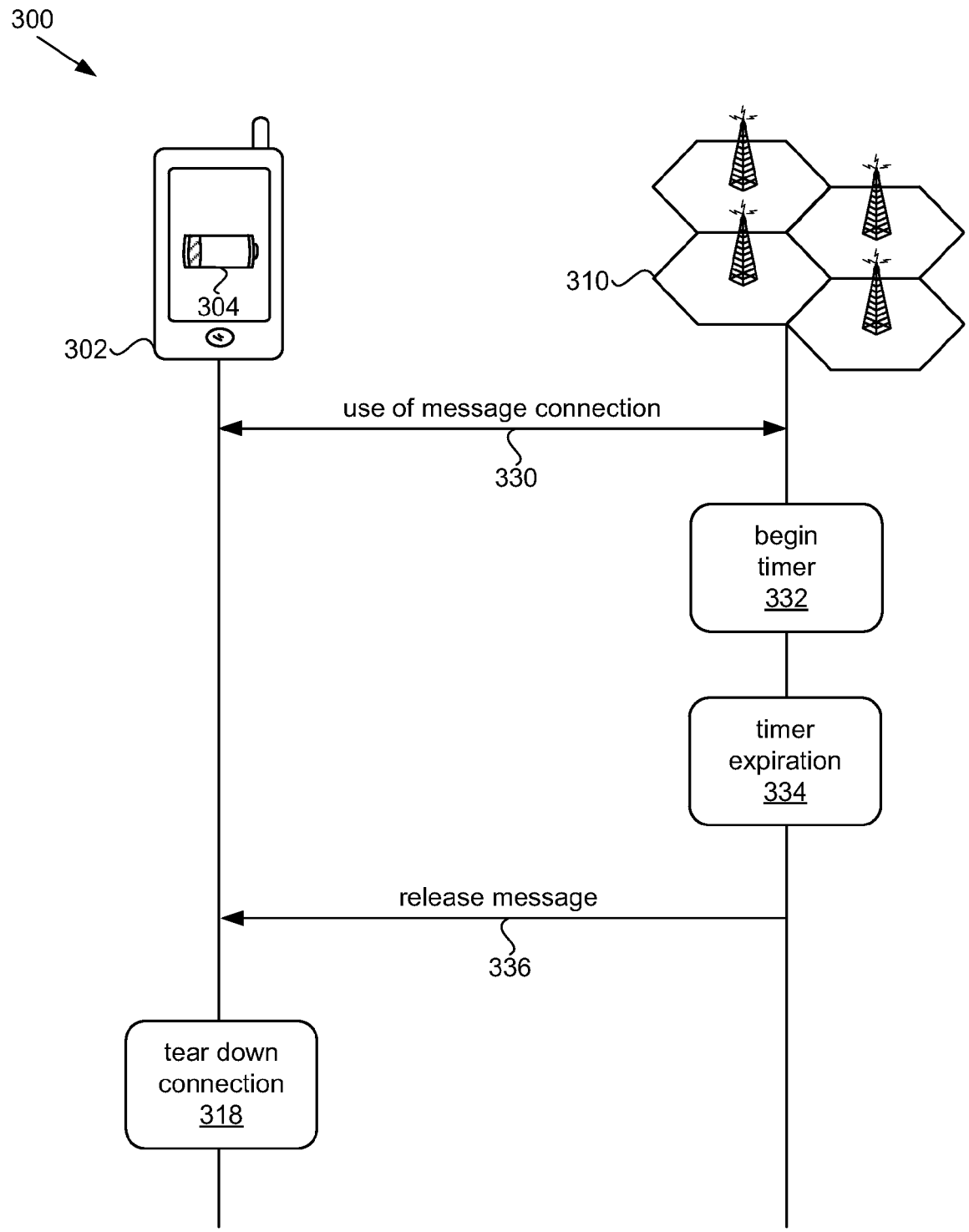
FIG. 3 is a block diagram illustrating a process to disconnect an RRC connection controlled by an Evolved-Universal Terrestrial Radio Access Network (E-UTRAN), and/or an element therein.

FIG. 3 depicts a process 300 to disconnect a messaging connection that is controlled by a RAN 310. In the process illustrated in FIG. 3, the wireless mobile device 302 is a passive participant. Knowledge of a UEs low potential need for an RRC connection and low remaining battery power 304 can be overlooked in the process depicted in FIG. 3. Determinations are made by the RAN.

Often, the E-UTRAN 310 makes a determination to allow a UE 302 to tear down its RRC connection on the basis of a timer. Such a timer can begin 332 after the UEs last use of the RRC connection 330. If the UE makes no additional use of the RRC connection before the timer expires 334, a release message can be sent 336 to the UE 302. The UE can then engage in the process of tearing down 318 the RRC connection.

From the perspective of the E-UTRAN 310, the central concern is determining that the UE 302 is actually finished with the RRC connection—i.e. that data will not be communicated for a selected period of time. This time period can be relatively long. As a result, the length of time that a UE waits before it can begin tearing down 318 an RRC connection can have a significant impact on its ability to save power. These times can be measured in seconds and often span several minutes. This is a significant amount of time where the power cost of maintaining an RRC connection can be two orders of magnitude. Even if these times were shortened, large inefficiencies are still likely to linger because individual UEs are in the best position to determine that the potential need for an RRC connection no longer merits the power cost. Furthermore, as new technologies place ever increasing demands on battery power, the need to conserve power becomes more pressing.

Figure 4:
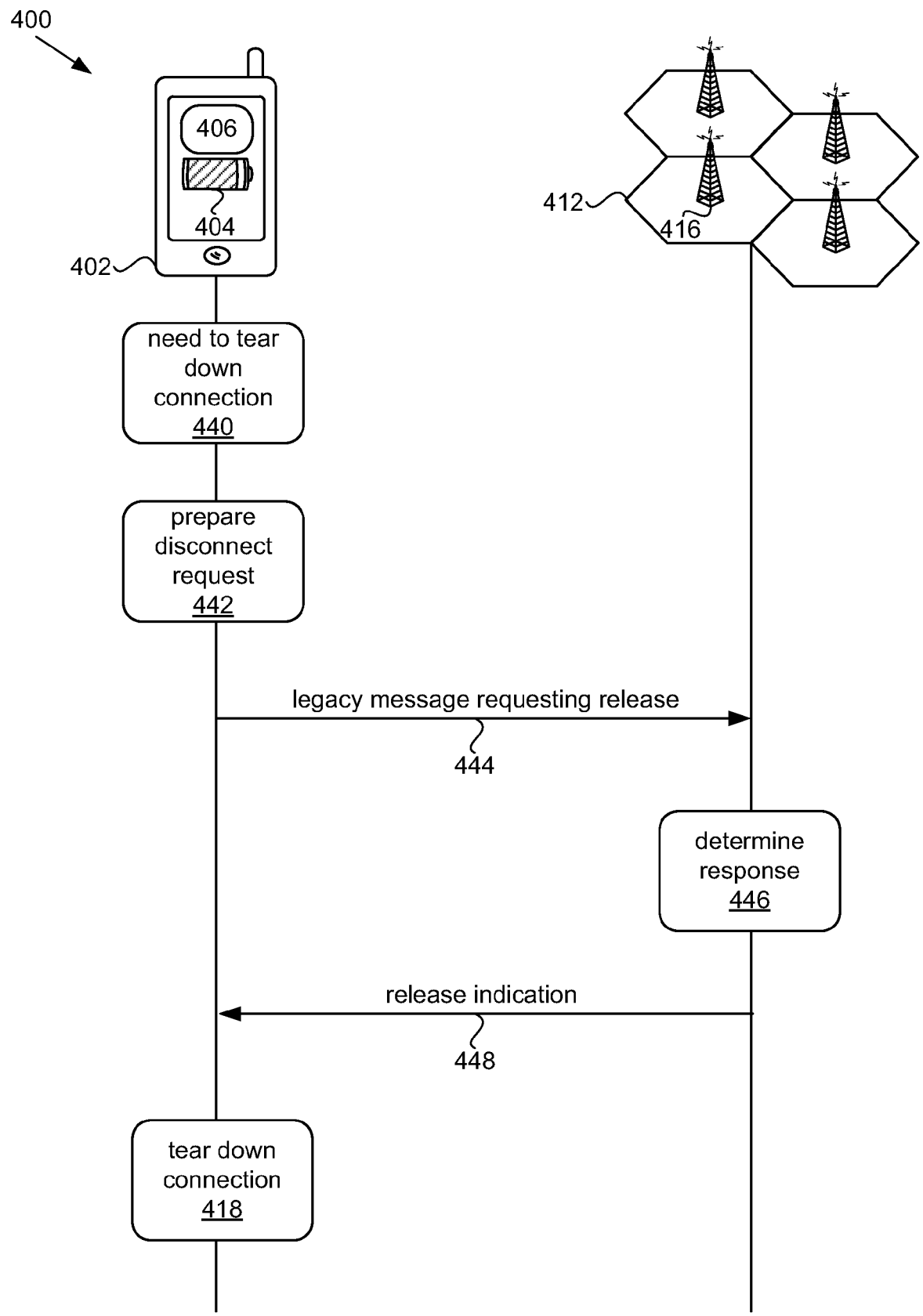
FIG. 4 is a block diagram illustrating a process to disconnect an RRC connection initiated by a UE and sanctioned by an E-UTRAN and/or an element therein in accordance with an example.

To reduce the amount of overhead and undesirable frequency of tear-down and reestablishment of a messaging connection, FIG. 4 depicts a more balanced process 400 to disconnect a messaging connection in accordance with an example. The process includes input from a wireless mobile device 402 and a RAN 412. This input can be used to avoid inefficiencies in the ability of the wireless mobile device to save power and to avoid placing unwarranted strains on the RAN.

In one embodiment, the process 400 is initiated by a UE 402. However, the process may proceed after the E-UTRAN 410 has had an opportunity to approve and sanction the process of tearing down the RRC connection. The process begins with the UE making a determination 440 that an RRC connection/messaging connection can be torn down. The determination can be made based on potential needs of a set of applications 406 and/or other information residing on, and/or local to, the UE. Additionally, the determination can be informed by a battery power level 404 at the UE.

In one example, a UE may decide to disconnect from the network if it is able to determine that there is no further network activity for the foreseeable future. The actual process for determining that no further network activity will occur for a period of time can be dependent on the type of UE and the Operating System (OS) used by the UE. For example an iPhone has software running in the OS that detects that the process has received all of the data needed by the iPhone from the network and no other process currently needs network access. The software running on the iPhone may thus decide to tear down the RRC connection. Another way to identify a time for tearing down an RRC connection is that an application itself can send signals to the radio layer that the application is done sending/receiving any information (i.e. a session has ended for example). This information may be used at the RRC layer to determine that the radio can be shut down to save power, thereby allowing the UE to make the determination 440 that an RRC connection/messaging connection can be torn down.

Once the determination 440 is made, the UE 402 can prepare, generate, and/or create 442 a disconnect request for disconnection of messaging connection/RRC connection. The UE can then communicate, and/or send, 444 the disconnect request to the E-UTRAN 410. In certain embodiments, the UE can send the disconnect request to an EPC in communication with the E-UTRAN or a cellular radio tower/eNodeB 416 within the RAN/E-UTRAN. The disconnect request can be embedded within a legacy message/carrier message, in certain embodiments, so that an additional message does not need to be defined.

In certain embodiments making use of a legacy message, the legacy message can include a field reserved for providing information about the cause behind the sending of the legacy message. In such embodiments, this field can be filled with an indication that the cause is power saving. One non-limiting example, provided for purposes of illustration, of such a legacy message, in the context of 3GPP LTE, is the CONNECTION REESTABLISHMENT REQUEST message. The message is defined in the specifications for 3GPP LTE, particularly TS 36.331.

The CONNECTION REESTABLISHMENT REQUEST message includes a portion reserved for three bits used to indicate an "establishment cause." The three bits make for 8 different potential values, 6 of which are already defined. The two remaining values are referred to as spare 1 and spare 2. Although it can be counterintuitive to use a message whose title states a purpose of establishing a connection to tear down the connection, the legacy message lends itself to this role. The spare 2 value can be used to indicate a cause to save power, although the value of spare 1 can also be used for this purpose. Upon receiving 444 a CONNECTION REESTABLISHMENT REQUEST from a given UE 402, where the establishment cause has a value indicating a cause to save power, the E-UTRAN 410 can interpret this message as a disconnect request.

Once the RAN 410 and/or a cellular radio tower therein 416 receives 444 the disconnect request, the RAN can vet the request by making a determination about whether to approve, sanction, and/or grant the tear down of the messaging connection at issue. A wide variety of factors can be used by the RAN and/or cellular radio tower to make this determination. For example, the number of wireless mobile devices served by the RAN and/or cellular radio tower can be a factor. In some scenarios, for example, a larger number of wireless devices can give the RAN and/or cellular radio tower a higher propensity to allow tear down of the messaging connection to proceed to reduce the load on the RAN and/or cellular radio tower.

A log can also be made by an E-UTRAN 410/eNodeB 416 to determine a number of times a particular UE 402 has established and/or torn down an RRC connection. The higher the number, the less likely the E-UTRAN/eNodeB can be to approve the disconnect request to prevent too much overhead. However, if there are fewer UEs being served, in some embodiments, and overhead is less of an issue, the E-UTRAN/eNodeB can be more lenient, thereby enabling a UE to tear down an RRC or other type of messaging connection more often. As a variation on this example, a threshold level can be set for a number of RRC connections established and/or disconnected in a predetermined amount of time, such as, by way of a non-limiting example, the number of times an RRC connection has been torn down within one minute. If the number is excessive, then the UE may not be allowed to tear down the RRC connection for a period of time. For example, if the tear down message is received more than 10 times a minute, the UE may not be allowed to tear down the RRC connection for 30 seconds. These examples are not intended to be limiting. A broad range of time periods, from tens of milliseconds to tens of minutes, may be appropriate to monitor for excessive UE teardown requests, based on system use and architecture of a WWAN.

In another example of a factor, a timer can be set after an RRC or other type of messaging connection is established or torn down. The E-UTRAN 410/eNodeB 416 can determine to sanction a tear down where a predetermined amount of time has elapsed. Examples of such times, provided by way of illustration and not limitation, can include a value in the range of 5 to 12 seconds and, more particularly 9 seconds. The actual range may vary from tens of milliseconds to tens of seconds, depending on system usage and system architecture of a WWAN. After this time period has passed, the teardown of the RRC connection for a UE may be sanctioned by the E-UTRAN 410/eNodeB 416.

An additional consideration can be whether or not there is any data to be sent to and/or received from the particular UE 402 responsible for the disconnect request. Other factors and considerations, based on information available to a RAN and its needs and functions, are also possible. The factors involved and the manner in which they are weighted can be changed dynamically based on the setup and architecture of the WWAN.

The wireless mobile device 402 can wait and/or listen for the determination. After a determination 446 to approve, sanction, and/or grant the disconnect request, the RAN 410 and/or cellular radio tower 416 can send 448, and the wireless mobile device can receive, a disconnect determination/release indication in response to the disconnect request. Upon receipt of the disconnect determination/release indication approving, sanctioning, and/or granting the disconnect request, the wireless mobile device can proceed to tear down 418 the messaging connection. The tear down process can be predefined. In some embodiments consistent with 3GPP LTE specifications, the tear down process can comprise transitioning from an RRC_CONNECTED state to an RRC_IDLE state to save power.

From the perspective of the E-UTRAN 410/eNodeB 416, the process 400 can be described as receiving a UE request 444 from a particular UE 402 to allow disconnection of a UE messaging connection. The E-UTRAN/eNodeB can then implement a decision process 446 along lines discussed above to determine whether to allow the UE request. Prior to engaging in the determination 446, the E-UTRAN 410/eNodeB 416 can extract the UE request from a predefined portion of a request message. In such embodiments, the request message can be generated according to a legacy message format for communications from the UE to the E-UTRAN/eNodeB.

Since the process 400 depicted in FIG. 4 relies on input from a wireless mobile device 402, some additional functionality at the wireless mobile device is called for. However, as is often the case with various functionalities within a WWAN, there may be wireless mobile devices that fail to immediately implement the functionality. This can lead to confusion as to how the tear down 418 of messaging connections should be handled. For example, the RAN 410 can lack knowledge as to whether it needs to set timers and control the disconnect process along lines similar to those discussed with respect to FIG. 3. Similarly, the RAN can lack knowledge as to whether it can allow the wireless mobile device to handle disconnect, along lines similar to those discussed with respect to FIG. 1. Further still, the RAN can lack knowledge as to whether it needs to be listening for a disconnect request to vet the appropriateness of a tear down on the messaging connection, along lines similar to those discussed with respect to FIG. 4.

Figure 5:
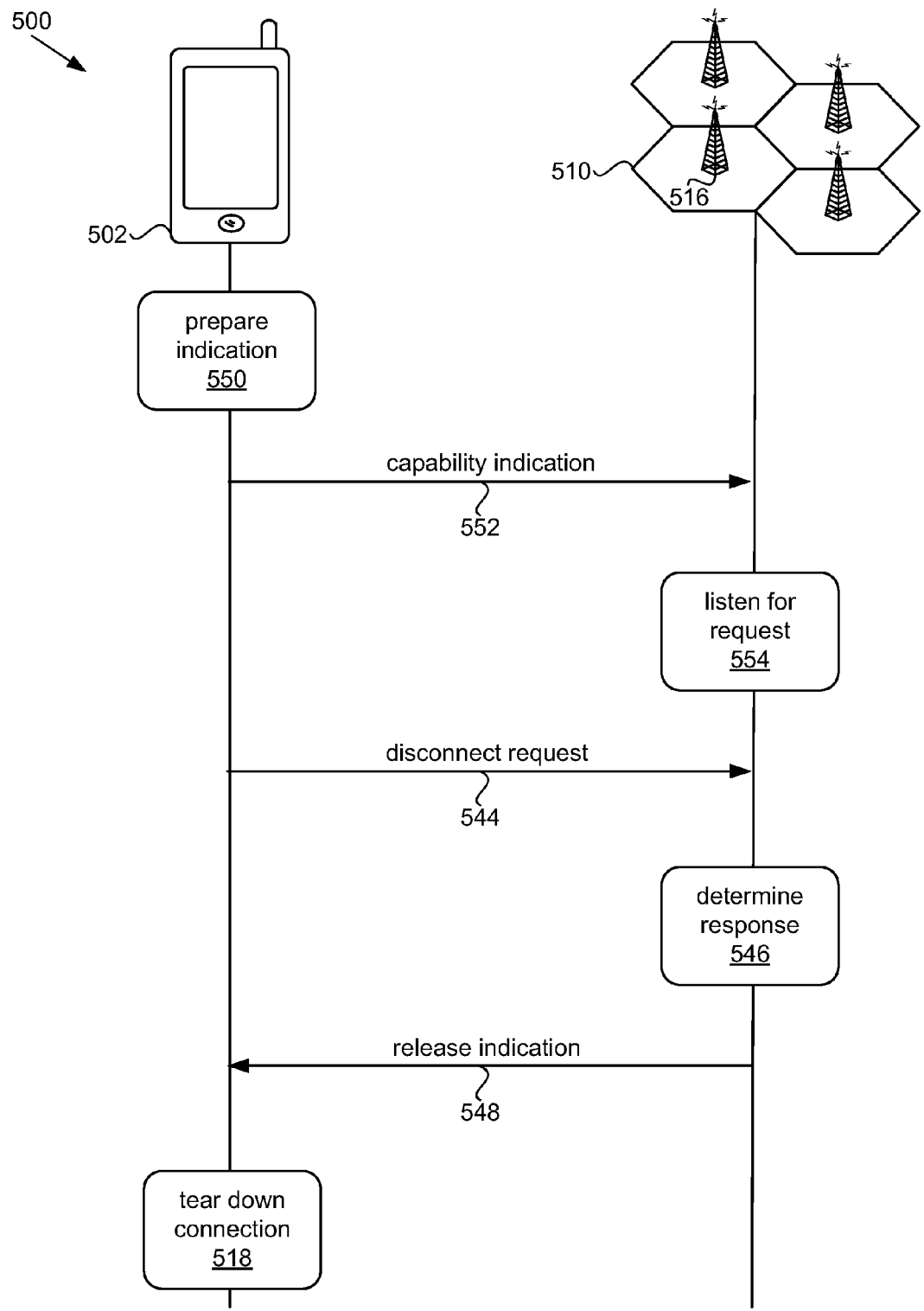
FIG. 5 is a block diagram illustrating a process of communicating a capability indication used to coordinate disconnection of an RRC connection between a UE and an E-UTRAN in accordance with an example.

FIG. 5 depicts a process 500 for communicating an indication to inform a RAN 510, and/or a cellular radio tower 516 therein. The indication can inform the RAN, and/or cellular radio tower that a wireless mobile device 502 supports the coordinated tear down of a messaging connection. The process can involve preparing 550 an indication to the RAN, and/or a cellular radio tower that the wireless mobile device is capable of disconnecting in response to a disconnect determination by the RAN, and/or cellular radio tower.

After preparing 550 the indication, the UE 502 sends the indication to the E-UTRAN 510 and/or an eNodeB 516 therein. Upon receiving the indication, the E-UTRAN/eNodeB can listen 554 for a release request from the UE that sent the indication. Once the UE that sent the indication also sends a disconnect request 544, the E-UTRAN/eNodeB can proceed along lines similar to those discussed with respect to FIG. 4. In the event that the E-UTRAN/eNodeB determines 546 that the disconnect request is approved, sanctioned, and/or granted, the E-UTRAN/eNodeB can send a release indication 548. Upon receipt of the release indication, the UE can commence the tear down 518 of an RRC connection.

Once the indication is provided 552, the whole process 500 can run smoothly to the disconnection 518 of an RRC connection. In some embodiments, the indication can be generated by embedding the indication in a capability message. The capability message can indicate that the UE 502 sending the capability message can support connection release for power saving. The capability message can be sent prior to the sending 544 of a disconnect request.

In some of such embodiments, the capability message can be generated 550 by inserting a predefined index value, and/or bit index value, in a capability/indication message. As used herein, the term bit index value refers to an index value for an indexed bit in a bit map used to indicate whether a given UE 502 supports, or does not support, a particular function. In certain of such embodiments, the indication message can be prepared according to a legacy indication format. When a legacy format is used, the predefined index value/bit index value can be assigned to a previously unassigned index value/bit index value supported by the legacy indication format. Once the predefined index value/bit index value is assigned, the indication message can convey that the UE 502 sending the indication message supports coordinated tear down of an RRC connection.

Embodiments consistent with specifications for 3GPP LTE can use the Feature Group Indicator (FGI), as defined in those specifications, as the legacy format. The FGI format uses a bit map to indicate whether or not a function assigned to each bit is supported by the UE 502 sending the FGI. In embodiments using an FGI, unassigned bits can be used to convey whether or not the UE sending the FGI supports coordinated teardown as described in FIG. 4 and FIG. 5. By way of example, and not limitation, unassigned bit 31 and/or unassigned bit 32 of a 32 bit FGI can be used for this purpose. Alternative bit index values can be used. For example, in larger FGIs, unassigned bit index value 117 can be used, as well as unassigned values 118 through 132.

For embodiments where the support of coordinated tear down, along lines similar to those described in FIG. 4, is mandatory, the preparation/generation 550 of a capability indicator may not be necessary. In such embodiments, the E-UTRAN 510 and/or an eNodeB 516 can assume that the UE 502 supports coordinated tear down and proceed accordingly. For the purpose of providing additional illustration, some additional embodiments, consistent with examples that both involve and do not involve capability indicators are provided below.

Figure 6:
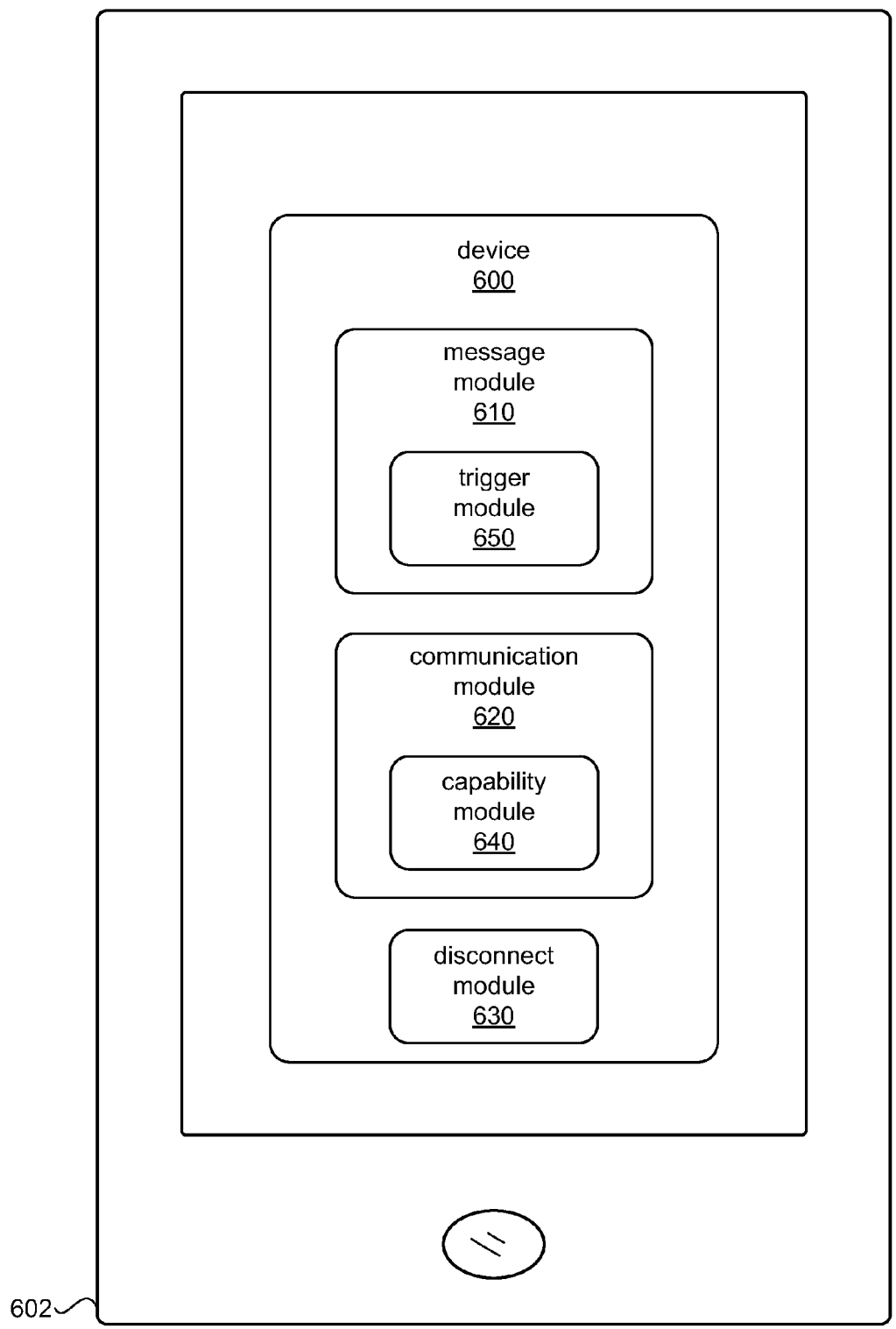
FIG. 6 is a block diagram illustrating a device operating at a UE to initiate the disconnection of an RRC connection after approval from an E-UTRAN in accordance with an example.

FIG. 6 depicts a device 600 operating at a wireless mobile device 602. The device can coordinate power conservation between a wireless mobile device and an RAN through connection management. The device can comprise a message module 610, a communication module 620, and a disconnect module 630.

The message module 610 can be configured to prepare a disconnect request. The disconnect request can convey a request for disconnection of a UE 602 messaging connection to an E-UTRAN. The message module and the communication module 620 can be in communication. The communication module can be configured to send the disconnect request to an eNodeB in the E-UTRAN. Additionally, the communication module can be configured to receive a disconnect determination in response to the disconnect request from the eNodeB.

A disconnect module 630 can be also be in communication with the communication module. The disconnect module can be configured to tear down the UE 602 messaging connection upon receipt of the disconnect determination, when the disconnect determination sanctions disconnection. In some of such devices 600, the disconnect request, the disconnect determination, and the UE messaging connection to be torn down can pertain to an RRC connection. Furthermore, the tear down of the RRC connection can allow the UE to transition from an RRC_CONNECTED state to an RRC_IDLE state.

The message module 610 can also be further configured to prepare the disconnect request by configuring a portion of a carrier message. The carrier message can be generated according to a legacy message format to convey the disconnect request. The disconnect request can be conveyed by indicating a cause of the carrier message as power saving.

Some devices 600 can also include a capability module 640, which can be in communication with the communication module 620. The capability module 640 can be configured to prepare an indication to the E-UTRAN that the UE 602 is capable of disconnecting in response to the disconnect determination. The communication module can then send the indication to the eNodeB in the E-UTRAN.

In some embodiments, the capability module 640 prepares the indication by inserting a predefined index value in an indication message and/or by manipulating a bit with a predefined index value. The indication message can be generated according to a legacy indication format. The predefined index value/bit with predefined index value is assigned to a previously unassigned value supported by the legacy indication format to convey that the UE supports the disconnect determination in response to the disconnect request.

Certain devices 600 can also include a trigger module 650, which can be in communication with the message module 610. The trigger module can be configured to trigger the message module to prepare the disconnect request based on information residing at the UE 602. In some embodiments, the information residing at the UE can include information about potential uplink traffic to be sent from the UE. The information can also include information about potential downlink traffic to be received at the UE. The trigger module can trigger the preparation of the disconnect request by the messaging module based on a determination that the UE messaging connection is not required for a threshold period.

With respect to certain devices 600, the message module 610 prepares the disconnect request by setting an establishment cause in an RRC CONNECTION REESTABLISHMENT REQUEST message to convey the reason behind the RRC CONNECTION REESTABLISHMENT REQUEST message is to save power. Additionally, the message module 610 can also prepare the disconnect request to include a priority level. The priority level can indicate an importance of having the disconnect request granted. The priority level can be based on a power level of a battery at the UE 602.

Figure 7:
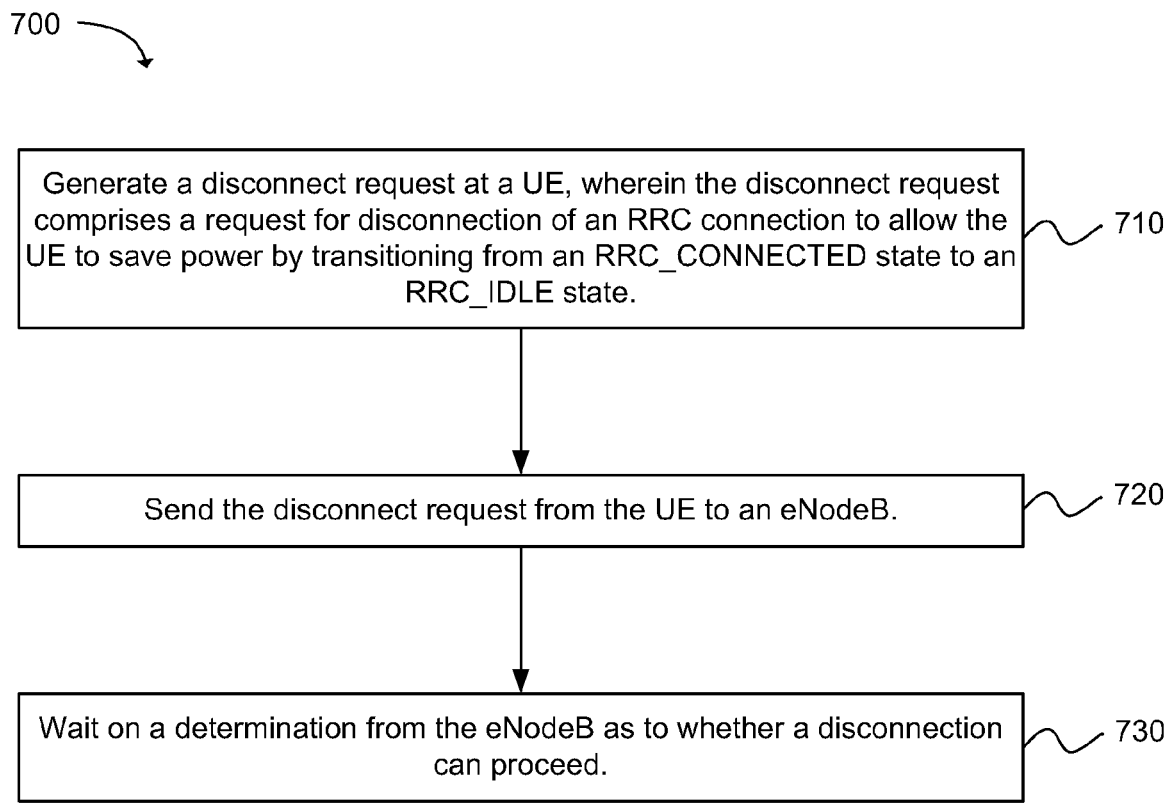
FIG. 7 is a flowchart depicting a process for UE initiated disconnect of an RRC connection to be completed upon a release indication received from an E-UTRAN after a determination by the E-UTRAN sanctioning disconnection in accordance with an example.

FIG. 7 provides a flowchart depicting a method 700 to coordinate a power-saving disconnection for a User Equipment from a wireless network in accordance with another example. The method can comprise generating 710 a disconnect request at a UE. The disconnect request can comprise a request for disconnection of an RRC connection to allow the UE to save power. The UE can save power by transitioning from an RRC_CONNECTED state to an RRC_IDLE state.

The method 700 can further comprise sending 720 the disconnect request from the UE to an eNodeB. Additionally, the method can comprise waiting 730 on a determination from the eNodeB as to whether a disconnection can proceed. In some, but not all embodiments, an additional step of effectuating a predefined process for tearing down the RRC connection can be included. The additional step is pursued upon receiving an indication that the disconnection can proceed in response to the disconnect request.

In some embodiments, the method of 700 further comprises determining to generate the disconnect request based on information local to the UE. Depending on the embodiment, the disconnect request can be embedded in a carrier message. Additionally, the carrier message can be generated according to a legacy message format for communications between the UE and the eNodeB.

Certain embodiments can embed the disconnect request in a portion of the carrier message dedicated, according to the legacy message format, to indicate a cause behind communication of the carrier message. In such embodiments, the disconnect request can comprise a defined cause category, the defined cause category indicating a need to save power. For embodiments that make use of a legacy message format, the legacy message format can be a format defined for an RRC CONNECTION REESTABLISHMENT REQUEST message as defined in 3GPP LTE specifications for one of Releases 8, 9, 10, and 11.

Additionally, the method 700 can further comprise first generating, at a UE, a capability message to indicate that the UE is configured to support connection release for power saving. Such embodiments can also comprise sending the message to the eNodeB prior to sending the first disconnect request. For such embodiments, the capability indicator message can be embedded in a capability indicator generated according to a legacy indicator format to communicate to the eNodeB a set of capabilities for which the UE is configured. Such a capability indicator message can comprise an index value and/or an indexed bit indicating that the UE is configured to support a connection release for power saving. As a non-limiting example, the pre-existing indicator format is a format defined for an FGI, as defined in 3GPP specifications for one of Releases 8, 9, 10, and 11. Another example that can be implemented on a UE is also provided with respect to the following figure.

Figure 8:
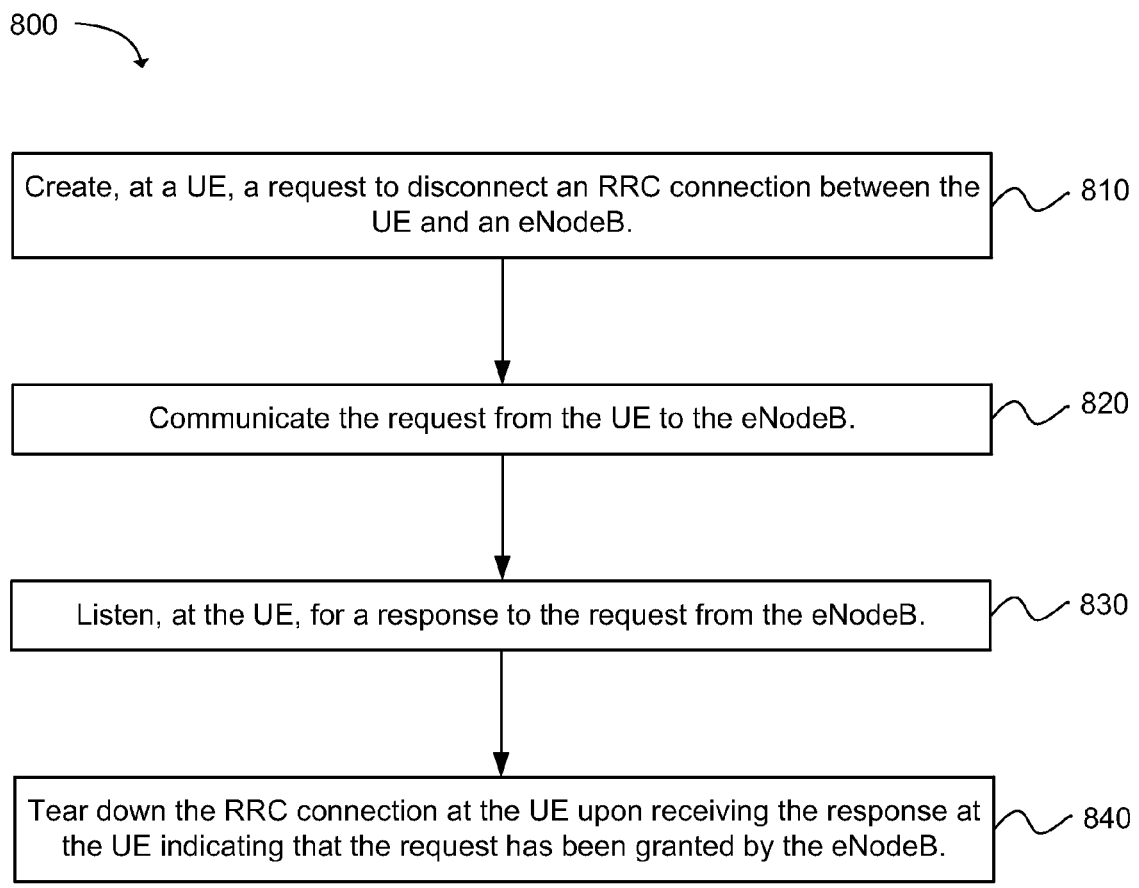
FIG. 8 is a flowchart depicting a process for tearing down an RRC connection after listening for a release indication received from an E-UTRAN in response to a release request from a UE in accordance with an example.

FIG. 8 is a flowchart depicting a process 800 for facilitating power saving by allowing an eNodeB to determine when to allow a UE disconnect request in accordance with an example. The process can, but need not necessarily, be embedded in a computer program product comprising a non-transitory computer usable medium. The computer readable medium can have a computer readable program code embodied therein. The computer readable program code can be adapted to be executed to implement instructions for the process.

The process 800 can comprise creating 810, at a UE, a request to disconnect an RRC connection between the UE and an eNodeB. The request can be communicated 820 from the UE to the eNodeB. The UE can then listen 830 for a response to the request from the eNodeB. Upon receipt of the response indicating that the request has been granted by the eNodeB, the UE can begin tearing down 840 the RRC connection.

In some embodiments, the request can be embedded in a message generated according to a legacy message format. For certain of these embodiments, the legacy format can be an RRC CONNECTION REESTABLISHMENT REQUEST message, as defined in 3GPP specifications for one of Releases 8, 9, 10, and 11.

Certain embodiments can further comprise first indicating to the eNodeB, by the UE, that the UE is configured to send a request to disconnect the RRC connection between the UE and the eNodeB to save power at the UE. This indicating step can allow the eNodeB to anticipate the request. The step of first indicating to the eNodeB that the UE is configured to send a request to disconnect the RRC connection can further comprises embedding an indication in an indication message generated according to a legacy indication format. The description of the next figure turns to the perspective from an eNodeB in an E-UTRAN.

Figure 9:
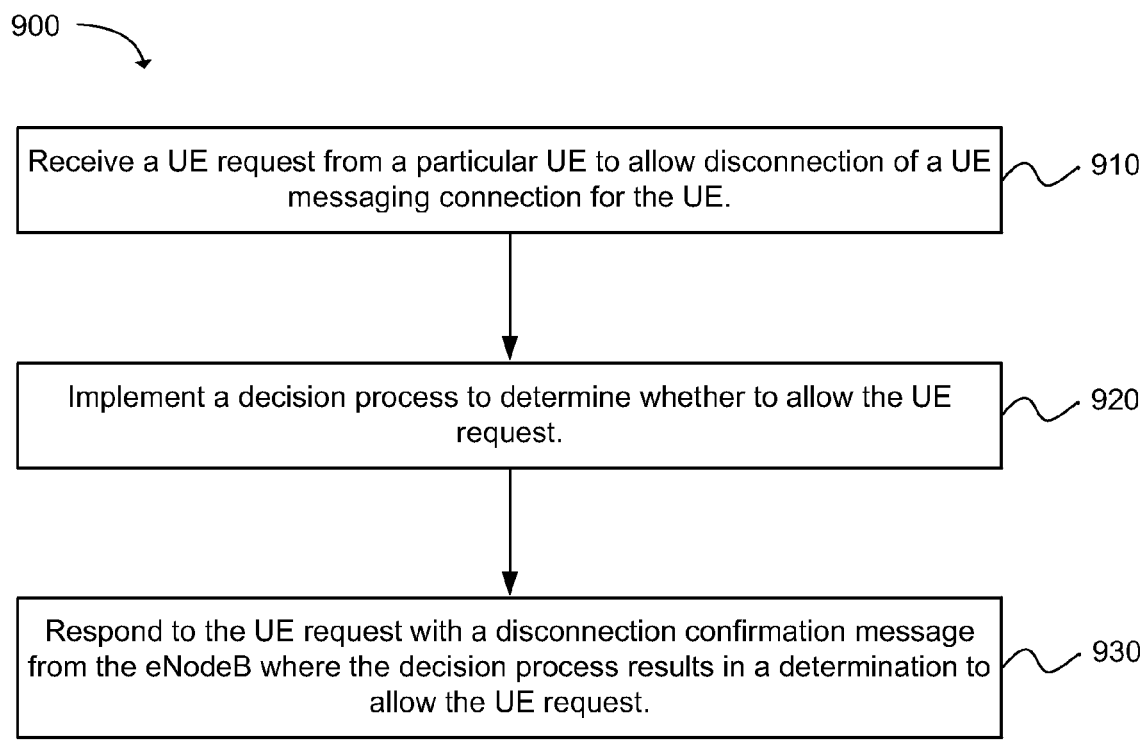
FIG. 9 is a flowchart depicting a process for vetting a UE request, within an E-UTRAN, to disconnect of an RRC connection to be performed at the UE upon receipt from the E-UTRAN of an affirmative release indication in accordance with an example; and, FIG. 10 is a block diagram of a UE in accordance with another example.

FIG. 9 is a flowchart depicting a method 900 for controlling UE efforts to save power through disconnection. The method can begin with an eNodeB receiving a UE request from a particular UE to allow disconnection of a UE messaging connection for the UE. The eNodeB can then proceed by implementing 920 a decision process to determine whether to allow the UE request. When the decision process results in a determination to allow the UE request, the UE can proceed by responding 930 to the UE request with a disconnection confirmation message.

The method 900 can further comprise listening for the UE request after receiving a capability indication from the particular UE. The capability indication can indicate that the particular UE is configured to support disconnection to facilitate power saving at the particular UE upon approval by the eNodeB. Additionally, the method can further comprise extracting the UE request from a predefined portion of a request message. The request message can have been generated in this portion according to a legacy message format for communication from the UE to the eNodeB.

In some embodiments, the decision process 920 can comprise the eNodeB evaluating the UE request based on a connection history for the UE maintained by the eNodeB. The decision process can use the connection history to determine if a sufficient amount of time has passed since previous activity of the UE related to its connection status with the eNodeB. When a sufficient amount of time has passed, the eNodeB can allow the UE to disconnect and reconnect. The decision process can also comprise the eNodeB evaluating traffic demands from a set of UEs associated with the eNodeB. The eNodeB can evaluate the traffic demands to decide if the eNodeB can accommodate an amount of overhead associated with allowing the UE to disconnect and reconnect.

Figure 10:
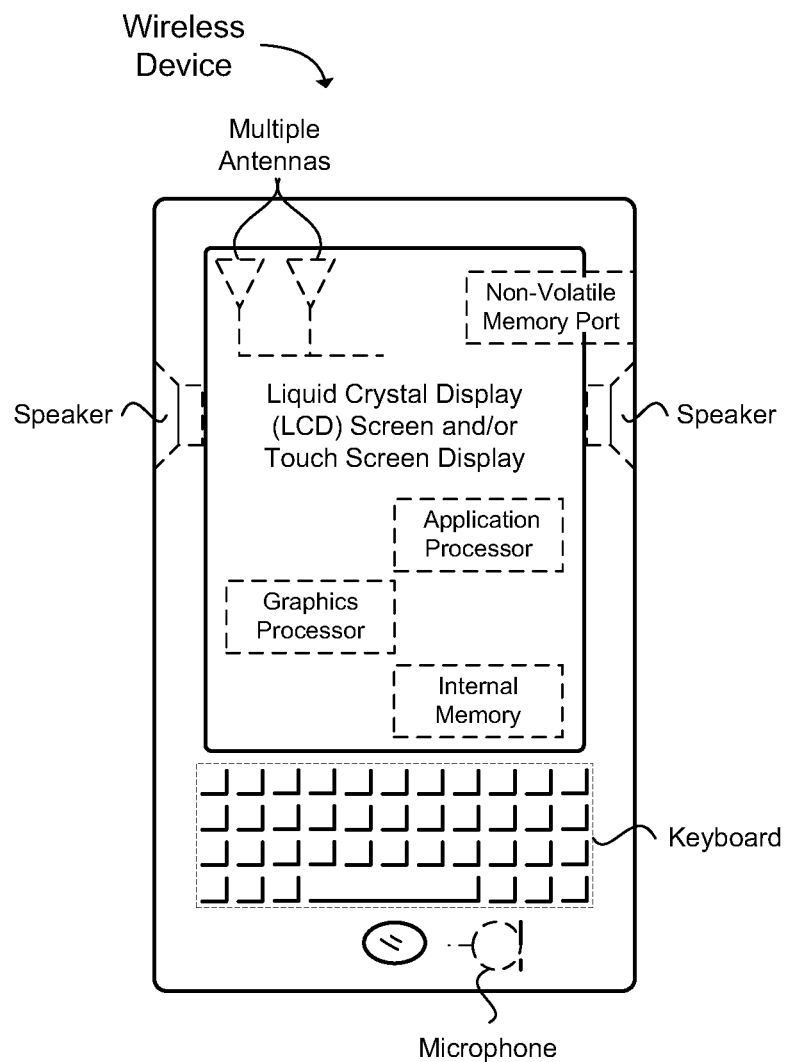

FIG. 10 provides an example illustration of a mobile device, such as UE, a mobile station (MS), a mobile wireless mobile device, a mobile communication device, a tablet, a handset, or other type of mobile wireless mobile device. The wireless mobile device can include one or more antennas configured to communicate with a BS, an eNodeB, or other type of WWAN transmission point. While two antennas are shown, the mobile device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 10 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to support power savings, the UE having circuitry configured to:
    generate a capability message to indicate to an evolved node B (eNB) that the UE is configured to support a coordinated radio resource control (RRC) connection release with the eNB for power savings at the UE;
    send the capability message from the UE to eNB;
    send a disconnect request message from the UE to the eNB to request the RRC connection release for power optimization at the UE, the disconnect request message including a binary value included in an establishment cause having three bits, the binary value indicating a cause to save power; and
    receive a release indication from the eNB indicating that the request has been granted by the eNB, wherein the UE is configured to perform the RRC connection release after receiving the release indication from the eNB.

2. The circuitry of 1, further configured to send the capability message from the UE to the eNB in an RRC message.

3. The circuitry of claim 1, further configured to send the disconnect request message from the UE to the eNB in order to assist the eNB in determining whether to grant the RRC connection release at the UE, wherin eNB is configured to listen for the disconnect request message upon receiving the capability message from the UE.

4. The circuitry of claim 3, wherein the disconnect request message sent from the UE to the eNB enables the eNB to determine whether to grant the RRC connection release based on network parameters.

5. The circuitry of claim 1, further configured to receive a response from the eNB to not grant the RRC connection release at the UE.

6. The circuitry of claim 1, wherein the UE includes an antenna, a touch sensitive display screen, a speaker, a microphone, a graphics processor, an application processor, an internal memory, or a non-volatile memory port.

7. A method to support power savings for a user equipment (UE), comprising:
    generating a capability message to indicate that the UE is configured to support a connection release that is coordinated with an evolved node B, the connection release being for power savings at the UE;
    sending the capability message from the UE to the eNB;
    sending a disconnect request message from the UE to the eNB to request a radio resource control (RRC) connection release for power optimization at the UE, the disconnect request message including a binary value included in an establishment cause having three bits, the binary value indicating a cause to save power; and
    receiving a release indication from the eNB indicating that the request has been granted by the eNB, wherein the UE is configured to tear down the RRC connection at the UE after receiving the release indication from the eNB.

8. The method of claim 7, further comprising sending the capability message from the UE to the eNB in an RRC message.

9. The method of claim 7, further comprising sending the disconnect request message from the UE to the eNB in order to assist the eNB in determining whether to grant the RRC connection release at the UE, wherein the eNB is configured to listen for the disconnect request message upon receiving the capability message from the UE.

10. The method of claim 7, further comprising receiving a response from the eNB to not grant the connection release of the RRC connection for power savings at the UE.

11. The method of claim 7, wherein the UE includes an antenna, a touch sensitive display screen, a speaker, a microphone, a graphics processor, an application processor, an internal memory, or a non-volatile memory port.

12. An evolved node B (eNB) for supporting power savings at a user equipment (UE), the eNB including circuitry configured to:
    receive a capability message from the UE indicating that the UE is configured to support a coordinated radio resource control (RRC) connection release with the eNB for power savings at the UE;
    receive a disconnect request message from the UE for the RRC connection release for power savings at the UE, the disconnect request message including a binary value included in an establishment cause having three bits, the binary value indicating a cause to save power, the eNB being configured to listen for the disconnect request message upon receiving the capability message from the UE;
    determine to grant the RRC connection release at the UE based on the disconnect request message; and
    release the RRC connection between the UE and the eNB for power optimization at the UE.

13. The circuitry of claim 12, further configured to determine whether to grant the RRC connection release based on network parameters.

14. The circuitry of claim 12, further configured to receive the capability message from the UE in an RRC message.

15. The circuitry of claim 12, further configured to send a response to the UE to not grant the RRC connection release for power savings at the UE.

16. The circuitry of claim 12, wherein the eNB is included in an Evolved-Universal Terrestrial Radio Access Network (E-UTRAN).

17. A computer program product comprising a non-transitory computer usable medium having a computer readable program code embodied therein, the computer readable program code adapted to be executed to implement instructions to facilitate power savings by allowing an evolved node B (eNB) to determine when to release a radio resource control (RRC) connection with a user equipment (UE), comprising:
    receiving a capability message, at the eNB from the UE, indicating that the UE is configured to support an RRC connection release for power savings at the UE, the RRC connection release being coordinated with the eNB;

receiving a disconnect request message from the UE for the RRC connection release for power savings at the UE, the disconnect request message including a binary value included in an establishment cause having three bits, the binary value indicating a cause to save power, the eNB being configured to listen for the disconnect request message upon receiving the capability message from the UE;

determining to grant the RRC connection release at the UE based on the disconnect request message; and releasing the RRC connection between the UE and the eNB for power savings at the UE.

18. The computer program product of claim 17, further comprising determining whether to grant the RRC connection release based on network parameters.

19. The computer program product of claim 17, further comprising receiving the capability message from the UE in an RRC message.

20. The computer program product of claim 17, further comprising sending a response to the UE to not grant the RRC connection release for power savings at the UE.

* * * * *